Sept. 21, 1971  J. J. DEUTSCH  3,606,833
COMMON SETTING MEANS AND INTERLOCK CASH REGISTER
AND CREDIT CARD RECORDER
Filed March 17, 1970  4 Sheets-Sheet 1
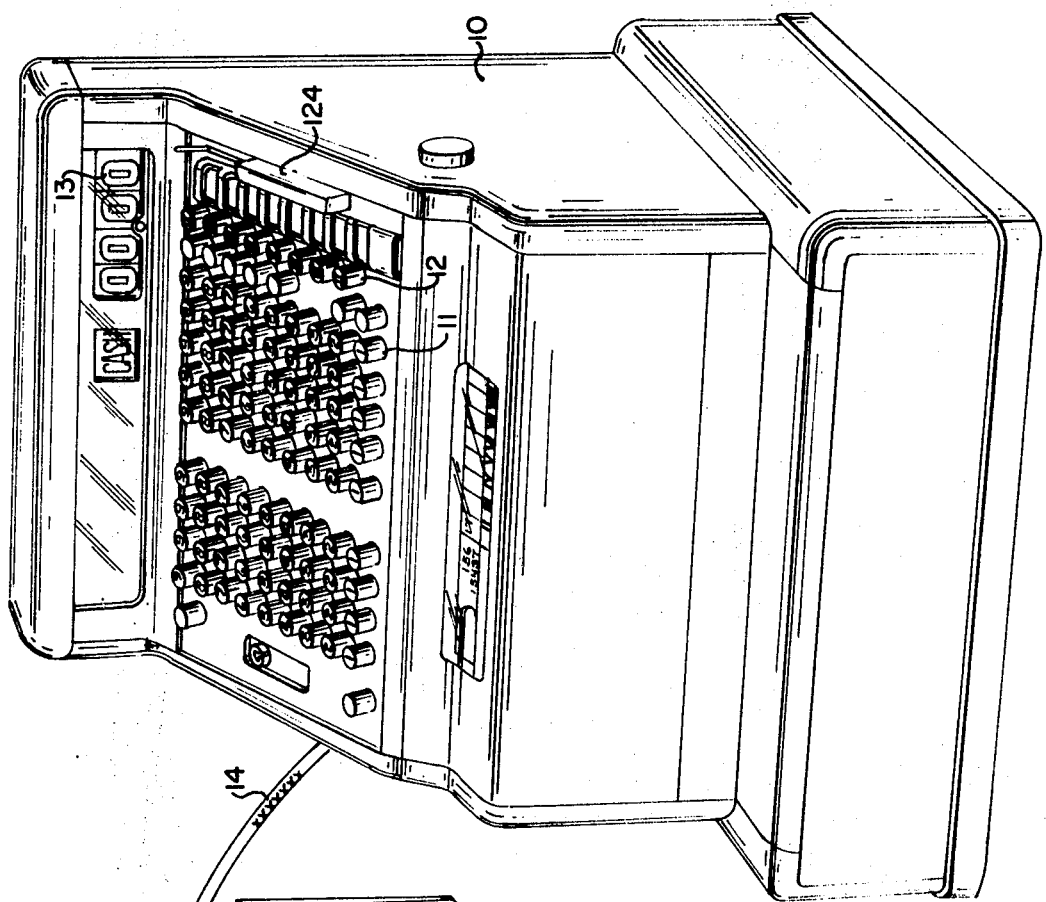
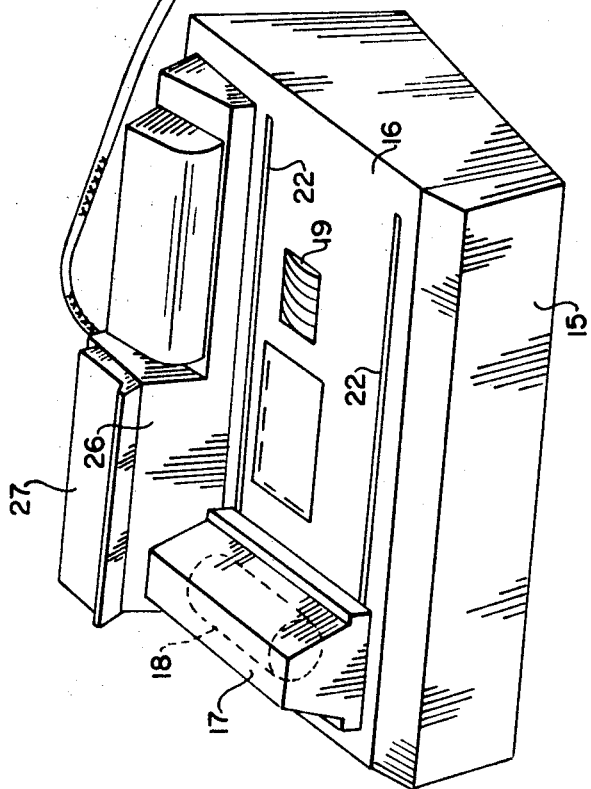
FIG. 1
INVENTOR
JAKOB J. DEUTSCH
BY
HIS ATTORNEYS

INVENTOR
JAKOB J. DEUTSCH

INVENTOR
JAKOB J. DEUTSCH

HIS ATTORNEYS

United States Patent Office 3,606,833
Patented Sept. 21, 1971

3,606,833
COMMON SETTING MEANS AND INTERLOCK CASH REGISTER AND CREDIT CARD RECORDER
Jakob J. Deutsch, Zurich, Switzerland, assignor to The National Cash Register Company, Dayton, Ohio
Filed Mar. 17, 1970, Ser. No. 20,236
Claims priority, application Great Britain, Mar. 27, 1969, 16,082/69
Int. Cl. B41j 29/64; B41l 39/12
U.S. Cl. 101—45                                                                 5 Claims

ABSTRACT OF THE DISCLOSURE

A data-recording system in which an amount set up in a cash register is automatically set up on the type wheels of a credit card recorder for printing on sales slips together with an imprint from a credit card inserted in the recorder. The cash register is automatically disabled from further operation until a recording operation of the credit card recorder occurs and is completed.

BACKGROUND OF THE INVENTION

This invention relates to a data-recording system which includes a credit card recorder in which information embossed on the credit card is printed on a sales receipt. The use of such a credit card for controlling credit transactions is well known. The information which is embossed on the credit card is normally the customer's name and address, and an account number.

When a sale is to be made to the holder of a credit card, documents such as a sales slip and a self-copying slip are placed on a printing table of a credit card recording device in which the credit card has been inserted. In all systems, the amount of the sale is set up manually in the recording device, as by the adjustment of setting levers, and a printing roller is manually drawn across the printing table to cause an imprint to be made from the credit card on the sales slip of the customer's name and account number, together with an imprint of the amount of the sale taken from type-wheels set by the manual setting levers. One copy of the sales slip is then handed to the customer as his record of the sale, and the other copy is used for posting the amount of the sale to be charged to the customer's account.

When the credit card recorder is used by iself, no effective cash control, such as analysis of sales, clerks' totals, cash total, etc., is provided, as is available where a dealer entry machine, such as a cash register, is used.

Prior installations have used a data entry machine in conjunction with the credit card recorder, but operating the recorder as a unit separate therefrom. However, two disadvantages exist with such a known arrangement. The first is that two manually-initiated recording transactions have to be made with respect to each credit transaction, and, secondly, there is no enforced agreement between the amount set up on a cash register and the amount set up on the recording device. It is therefore an object of the present invention to overcome the above-mentioned disadvantages.

SUMMARY OF THE INVENTION

A data-recording system which includes a cash register electrically connected to a credit card recorder. The credit card recorder includes a plurality of type carriers set under control of the cash register, a printing member which is manually operated to print from the type carriers and from a credit card inserted into the recorder, and electrical switch means controlled by the printing member for controlling the operation of the cash register.

BRIEF DESCRIPTION OF THE DRAWINGS

FIG. 1 is a perspective view of the data-recording system, which includes a cash register and a credit card recorder.

DETAILED DESCRIPTION OF THE PREFERRED EMBODIMENT

Figure 2:
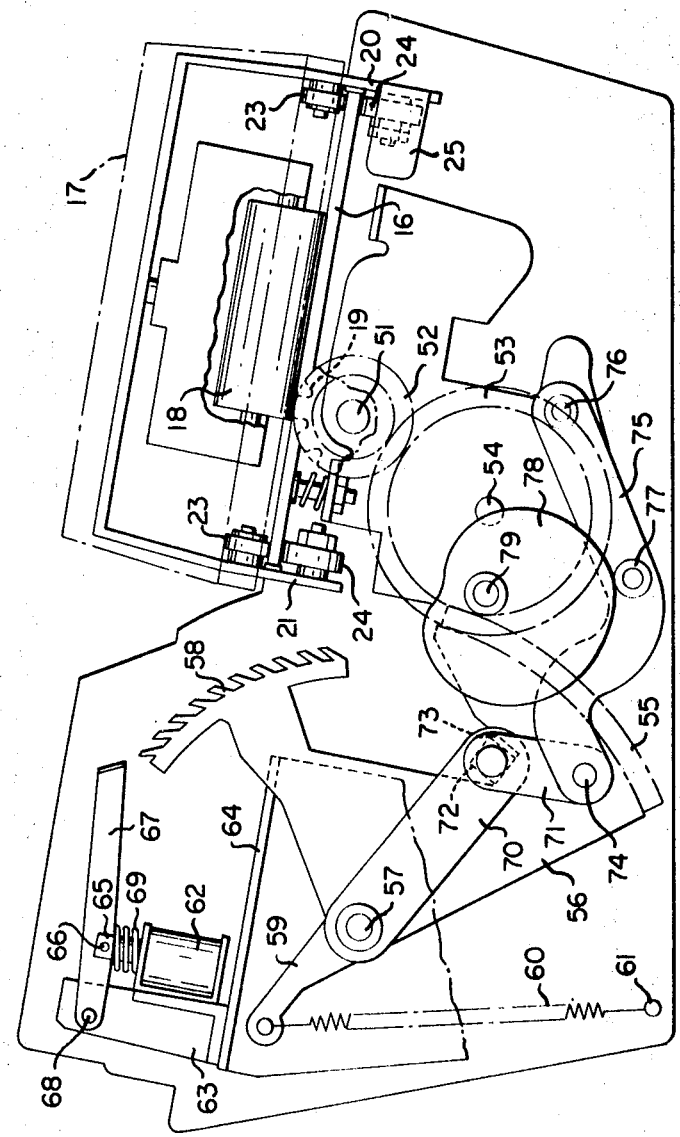
FIG. 2 is a partial sectional side view of the credit card recorder, showing details of a type wheel setting unit.

Referring now to FIG. 1, there is shown a perspective view of the data-recording system, which includes a cash register 10 and a credit card recorder 15. The recorder 15, as disclosed in U.S. Pat. No. 3,018,725, issued Jan. 30, 1962, on the application of John A. Maul et al., is of conventional construction for the major part and will not, therefore, be described in detail, except in so far as is necessary for an understanding of the present invention. As shown in FIG. 1, the cash register 10 has a number of banks of numbered amount keys 11, a bank of transaction control keys 12, and an indicator mechanism 13. As is well known in the art, the indicator mechanism 13 is adapted to control the setting of a number of denominational electrical amount switches, which will be described more fully hereinafter. A motor bar 124 is adapted to be operated, after depression of an amount key 11, and one of the transaction control keys 12, to release the cash register for a cycle of operation, as will be described more fully hereinafter.

Electrical connections, described hereinafter, are embodied in a cable 14 connecting the cash register 10 to the credit card recorder 15. The recorder 15 has a flat table 16, on which a credit card (not shown) and a sales slip (not shown) can be placed.

Mounted for a printing movement from left to right, as seen in FIG. 1, across the table 16 is a manually-operable printing member 17 (FIGS. 1 and 2), carrying a resiliently mounted printing roller 18, by means of which an impression may be made on a sales slip from a credit card, and a series of denominational amount type wheels 19, to be described more fully hereinafter. Side portions 20, 21 (FIG. 2) of the printing member 17 are adapted to slide in a pair of guide-ways 22, located in the table 16 (FIG. 1), while upper rollers 23 and lower rollers 24 (FIG. 2) cooperate with the upper and lower surfaces, respectively, of the table 16. The front side portion 20 is provided with a lug 25, the function of which will be described more fully hereinafter.

A receptacle 26 (FIG. 1) on the recorder 15 is provided with a lid 27 and serves to accommodate one copy of each of the sales slips after they have received imprints from the credit card and the type wheels 19.

Figure 3:
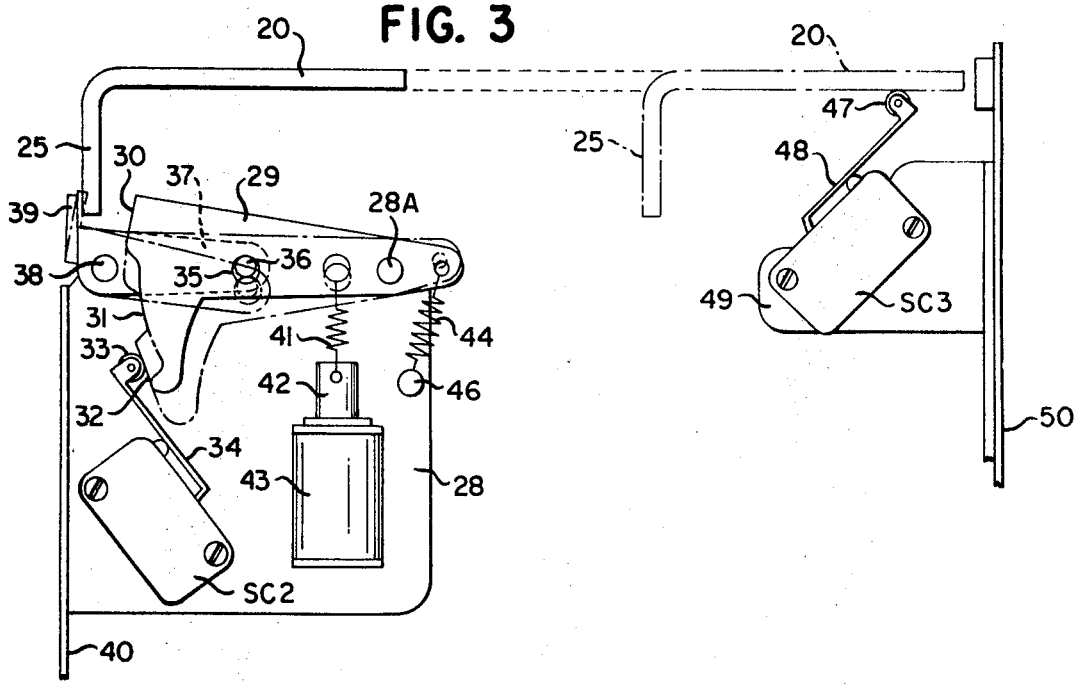
FIG. 3 is a bottom detailed view of a latch mechanism in the recording device for controlling the printing movement of a manually-operated printing platen, and a switch controlled by the movement of the printing platen in a printing direction.

Referring now to FIG. 3, there is shown a stud 28A, mounted on a plate 28 secured to a frame member 40 of the recorder 15, which stud 28A pivotally supports a latch member 29 having a locking surface 30, which coacts with the lug 25, and a recessed portion 31. Another surface 32 of the latch member 29 cooperates with a roller 33 on an actuating arm 34 of a micro-switch SC2, the function of which will be described more fully hereinafter. The normal position of the latch member 29 is shown in full lines, while its actuated position is shown in phantom lines.

An aperture 35 in the latch member 29 (FIG. 3) freely accommodates a stud 36 mounted on a lever 37, which in turn is pivoted on a stud 38 mounted on the plate 28. The lever 37 has an upstanding portion 39, which cooperates with the lug 25 in a manner to be described more fully hereinafter. The normal position of the lever 37 is shown as solid and dotted lines, and its actuated position is shown in phantom lines. Secured to the latch 29 is one end of a spring member 41, the other end of which is secured to an armature 42 of a solenoid 43. As will be described more fully hereinafter, the printing member 17 (FIG. 1) is normally latched in its home position by the latch member 29 when the solenoid 43 is de-energized, and is released for movement in the printing direction when the solenoid 43 is energized.

A second spring 44 has one end secured to the latch 29, and its other end is secured to a stud 46 mounted on the plate 28. The spring 44 normally maintains the latch 29 in the position shown in full lines in FIG. 3, wherein the surface 30 of the latch 29 lies in the path of a left-to-right (as seen in FIG. 3) printing movement of the lug 25. Upon completion of a printing movement of the printing member 17 (FIG. 1), at which time the front side portion 20 is in its most right position, as shown by the phantom lines in FIG. 3, the side portion 20 cooperates with a roller 47 on an actuator member 48 of a micro-switch SC3, so as to close the switch, the switch being mounted on a bracket 49 secured to a frame member 50 of the recording device. The function of the micro-switch SC3 will be described more fully hereinafter.

The cash register 10 (FIG. 1) contains a number of amount banks of keys 11, and a corresponding number of type wheels 19 and associated elements are located in the credit card recorder 15. Since all of the type wheel arrangements for the different denominational orders are similar in construction, only one such type wheel arrangement (as illustrated in FIG. 2) will be described herein.

Referring to FIG. 2, there is shown, rotatably mounted on a shaft 51, the type wheel 19. A gear 52, which is operatively connected to the type wheel 19, meshes with a gear 53 rotatively mounted on a shaft 54, the gear 53 meshing in turn with teeth 55 on a type wheel setting segment 56, which in turn is rotatively mounted on a shaft 57. The segment 56 is provided with a number of teeth 58, each of which represents a digital setting position "0" to "9" of the segment 56. As will be described more fully hereinafter, the segment 56 is restored to its home position after each setting operation, causing the type wheel 19 to be restored to its zero position.

The segment 56 has a projection 59 extending rearwardly, as seen in FIG. 2, to which is secured one end of a strong spring member 60, the other end of which is secured to a fixed stud 61 mounted to the framework of the recorder. A solenoid 62 is secured by means of a bracket 63 to a frame member 64. The armature 65 of the solenoid 62 is pivotally connected to a stud 66 on a segment latch 67, which in turn is pivoted on a stud 68 mounted on the bracket 63. A spring 69, mounted between the lower edge of the latch 67 and the top of the solenoid 62, normally maintains the latch 67 out of engagement with the teeth 58 of the segment 56, as shown in FIG. 2.

A lever 70 is pivotally mounted at one end of the shaft 57, the other end of the lever 70 being pivotally connected to one end of a short link 71 carrying a square stud 72, which in turn loosely engages a cut-out portion 73 of the segment 56. Pivotally connected to a stud 74 mounted on the other end of the link 71 is a second lever 75, which is pivoted on a stud 76 and which carries, intermediate its ends, a roller 77. In the operation of the credit card recorder, the spring 60 normally urges the segment 56 counter-clockwise about the shaft 57, causing the cut-out portion 73 of the segment 56 to urge the link 71 upwardly, as seen in FIG. 2, through its engagement with the square stud 72. The link 71 in turn urges the lever 75 clockwise about the stud 76, bringing the roller 77 into engagement with the peripheral edge of a cam 78 eccentrically mounted on the main cam shaft 79 of the recorder. The peripheral edge of the cam 78 is profiled so as to correspond to all possible digital settings of the segment 56. The main shaft 79 is driven by means of an electric motor 96 (FIG. 4) through a first portion of a cycle of rotation, and then, after a printing operation has been performed, the shaft 79 is driven through the remainder of the cycle of rotation, as will be described more fully hereinafter. As the cam 78 rotates during the first portion of the cycle, the segment 56 is rotated under the action of the spring 60 until the solenoid 62 is energized to bring the latch 67 into engagement with one of the teeth 58, thereby latching the segment in a position corresponding to a selected digit, as will be described more fully hereinafter.

Figure 4:
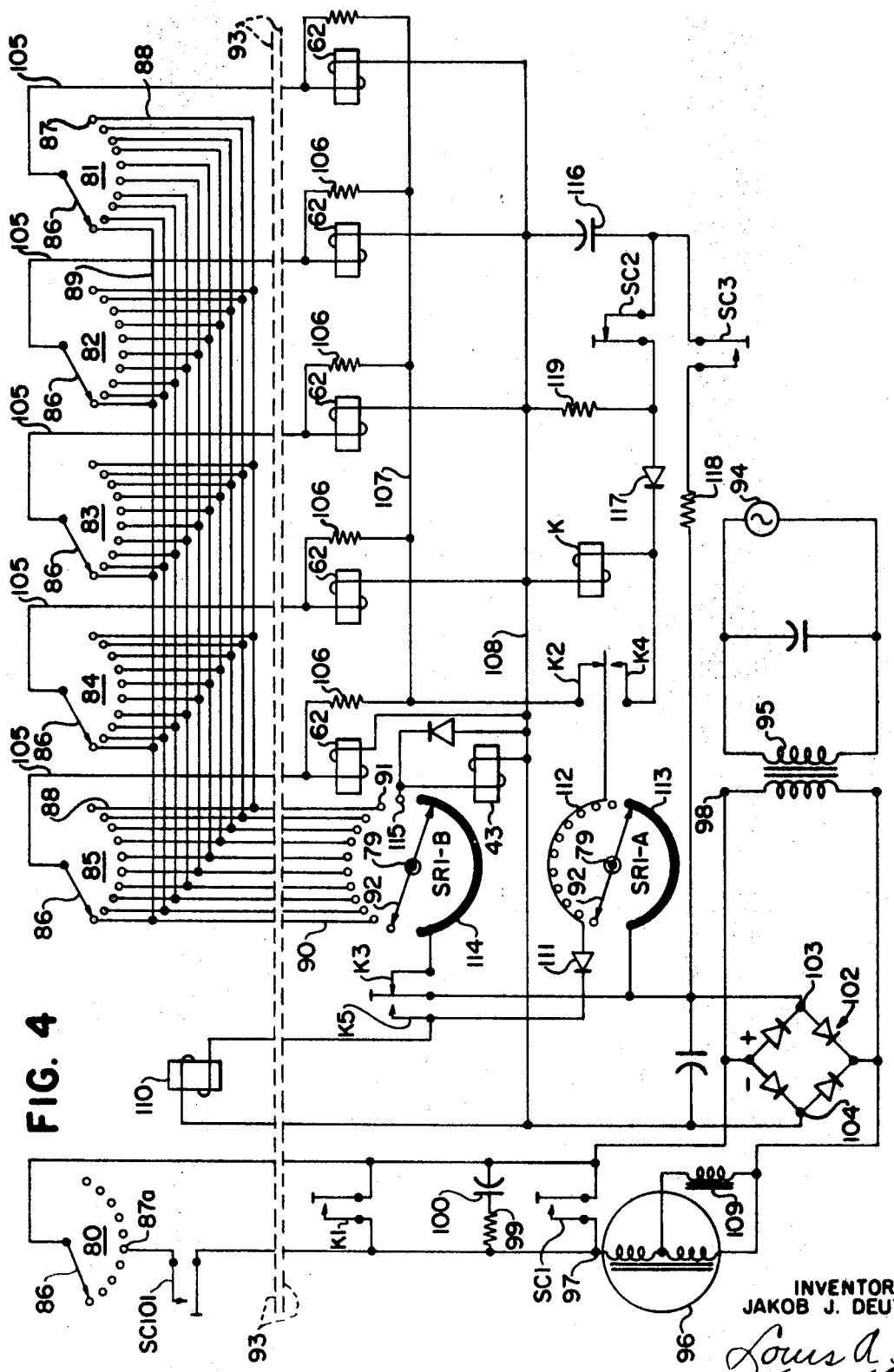
FIG. 4 is a schematic diagram of the electrical circuitry included in the data-recording system.

Referring now to FIG. 4, there is shown a schematic diagram of the electrical connections between the cash register 10 (FIG. 1) and the credit card recorder 15. The cash register is provided with a plurality of arcuate stepping switches 80 to 85 inclusive. It should be understood that the cash register is of known construction and will not be described in detail except so far as is necessary for an understanding of the present invention. Reference should be made to U.S. Pat. No. 3,006,538, which issued Oct. 31, 1961, on the application of Johann J. Deutsch, for a complete description of the construction and operation of read-out switches controlled by the cash register. The switches 81 to 85, inclusive, are respectively associated with the banks of amount keys (FIG. 1) of the cash register 10, while the switch 80 (FIG. 4) is associated with the bank of transaction control keys 12 (FIG. 1) of the cash register 10.

Each of the switches 80 to 85 inclusive has a wiper arm 86, which is set, in a well-known manner, to a position corresponding to the respective amount key 11 or transaction control key 12 which has been actuated. Each wiper arm 86 will remain in the set position, in contact with an appropriate one of a series of fixed contacts 87, which respectively represent the digits "0" to "9," inclusive, at the conclusion of a cycle of operation of the cash register. It should be noted at this time that the various wipers and relay contacts shown in FIG. 4 are all shown in their home positions.

A conductor 88 connects the fixed contacts 87 of the switches 81 to 85 to corresponding ones of a plurality of common conductors 89, so that all conductors 88 for the "1" contact position, for example, are connected to a common "1" conductor 89. Each of the common conductors 89 is connected to a corresponding one of a plurality of conductors 90 included in the credit card recorder, the conductors 90 being respectively connected to ten fixed contacts 91 (which respectively represent the digits "0" to "9") of an arcuate two-level stepping control switch SR1–A, SR1–B, having wipers 92 secured to the main shaft 79 of the recorder, so as to rotate in unison therewith. It should be noted that the components shown above the upper dotted line 93 in FIG. 4 are included in the cash register, while the components shown below the lower dotted line 93 are included in the credit card recorder, connections between the two sets of components being established by means of the cable 14 (FIG. 1).

Power is supplied to this system from an electrical source 94 (FIG. 4) connected to the primary windings of a transformer 95, the secondary windings of which provide the power supply for the motor 96. A terminal 97 of the motor 96 is connected to a corresponding terminal 98 of the secondary winding of the transformer 95 via the parallel combination of a normally open switch SC1, a spark suppressor constituted by a series combination of a resistor 99 and a capacitor 100, and a normally open relay contact K1 of a relay K. The terminal 97 is also connected to a normally open switch SC101 to a fixed contact 87A of the arcuate stepping switch 80, the wiper arm 86 of the switch 80 being arranged to engage the contact 87A when a transaction control key 12 marked "Credit Total" of the cash register is actuated; the fixed end of this wiper arm 86 is connected to the terminal 98 of the transformer 95. The output of the secondary winding of the transformer 95 (FIG. 4) is applied to a rectifier 102, which provides a D.C. voltage supply to a system between a positive terminal 103 and a negative terminal 104.

A conductor 105 extends from each of the wipers 86 of the switches 81 to 85, inclusive, to one end of a respective solenoid 62 (FIGS. 2 and 4), and their respective resistors 106 to a common line 107, the other end of the solenoid 62 being connected to a common line 108, which in turn is connected to the negative supply terminal 104 of the rectifier 102. The solenoid 43 (FIGS. 3 and 4) is connected between the line 108 and a fixed contact 115 of the stepping switch SR1–B.

One side of a solenoid 110 is connected to the negative supply terminal 104 of the rectifier 102, while the other side of the solenoid 110 is connected via a diode 111 to a continuous contact 112 of the stepping switch SR1–A and via a normally open contact K5 of the relay K to the positive terminal 103 of the rectifier 102. The continuous contact 112 is also connected to the normally closed contact K2 of the relay K, which in turn is connected to the line 107. The positive terminal 103 of the rectifier 102 is also connected via a resistor 118 and a normally open switch SC3 to one terminal of a capacitor 116, the other terminal of which is connected to the line 108.

One side of the relay K is connected to the line 108, while the other side of this relay is connected via a diode 117 and a normally closed switch SC2 to that terminal of the capacitor 116 remote from the line 108. A resistor 119 is connected between the line 108 and the anode terminal of the diode 117. The continuous contact 112 of the switch SR1–A is also connected via a normally open contact K4 of the relay K to that side of the relay K remote from the line 108, while an arcuate contact 113 of this switch is directly connected to the positive supply terminal 103. The operation of the various electrical components just described will be described more fully hereinafter with relation to the operation of the recorder.

Figure 5:
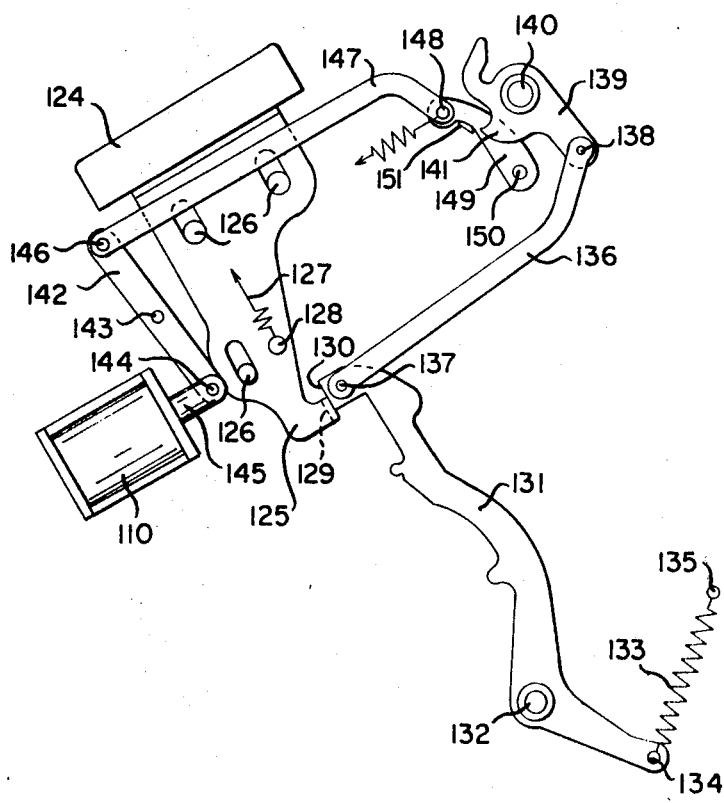
FIG. 5 is a detailed view showing the mechanism for releasing the cash register for a cycle of operation and the locking mechanism for disabling such release of the cash register when the recording device is being operated.

Referring now to FIG. 5, there is shown the motor bar 124 (FIG. 1) secured to a plate 125 securely mounted on a stud 126 and normally urged upwardly by a spring 127. One end of the spring 127 is secured to a stud 128 mounted on the plate 125, while the other end of the spring is secured to a fixed stud (not shown) mounted in the machine. The lower end of the plate 125 has a lug 129 normally lying in the path of an upper portion 130 of a lever member 131, which in turn is pivoted on a fixed stud 132 and urged counter-clockwise, as seen in FIG. 5, by a spring 133 anchored to a stud 134 mounted on the lever 131 and to a fixed stud 135 mounted in the machine. A link 136, pivotally connected at one end by a stud 137 mounted on the lever 131, has its other end pivotally connected by a stud 138 to an arm 139 secured on a machine release shaft 140, and has a projection portion 141.

A lever 142, pivoted intermediate its ends on a fixed stud 143, is pivotally connected at one end by a stud 144, mounted on an armature 145 of the solenoid 110 (FIG. 4), and has its other end pivotally mounted on a link 147 by means of a stud 146. The link 147 is also pivotally connected at its other end by a stud 148 mounted on an arm 149, which in turn is pivoted on a fixed stud 150 and has a lug portion 151 adapted to cooperate with the projection portion 141 of the arm 139 to lock the cash register against release for a cycle operation, in a manner to be described more fully hereinafter.

The driving motor 96 (FIG. 4) drives the main shaft 79 (FIG. 2) of the recording device. The motor 96 has a stopping disc (not shown) on its driving shaft and a cooperating electro-magnetic brake member having a control solenoid 109 (FIG. 4), the brake acting to arrest the motor shaft when the current supply to the motor 96 and the solenoid 109 has been cut off. A control cam (not shown) on the main shaft 79 of the recorder controls actuation of the switch SC1, as will be described more fully hereinafter. The switch SC101 is controlled by a cam (not shown) on a cam shaft (not shown) of the cash register, the switch SC101 being arranged to be closed at the commencement of a cycle of operation of the cash register, in a manner well known in the art. The operation of the data recording system will now be described.

To initiate an operation of the data-recording system, the operator places a credit card and a sales slip on the table 16 (FIGS. 1 and 2) of the recorder 15, sets up the amount of the sale transaction on the amount keys 11 of the cash register 10, depresses the "Credit Total" transaction control key 12, and then operates the motor bar 124. When the motor bar 124 (FIGS. 1 and 5) is depressed, the plate 125 (FIG. 5) is moved downwardly, removing the lug 129 from the path of the portion 130 of the lever 131, which is now rocked counter-clockwise, as seen in FIG. 5, by the spring 133, causing the link 136 to rock the arm 139 clockwise. This clockwise rocking of the arm 139 rocks the machine release shaft 140 also clockwise to release the cash register for a cycle of operation in a manner well known in the art. At this time, the wiper arm 86 of the switch 80 (FIG. 4) is set to the fixed contact 87A.

During a cycle of operation of the cash register for which the "Credit Total" control key 12 has been depressed, and following setting of the wipers 86 of the amount switches 81 to 85, inclusive, under control of the indicator mechanism 13 (FIG. 1) in a manner well known in the art, the switch SC101 is closed by a cam (not shown) mounted on the main shaft of the cash register, so that the motor 96 of the recorder 15 is energized over the contact 87A and the wiper arm 86 of the switch 80 to cause the main shaft 79 to commence its first portion of a cycle of rotation.

At five degrees' rotation of the shaft 79, the switch SC1 (FIG. 4) is closed and remains closed until one hundred and sixty degrees of rotation, so that the motor 96 is kept running when the switch SC101 in the cash register opens towards the end of the cycle of operation of the latter. Also at five degrees' rotation of the shaft 79, the wiper 92 of the switch SR1–A engages the continuous contact 112 (FIG. 4) and thereby causes the solenoid 110 to be energized via the diode 111 to lock out the cash register against further operation until the recording operation has been completed. When the solenoid 110 is energized, its armature 145 (FIG. 5) is pulled inwardly, rocking the lever 142 clockwise, to cause the link 147 to rock the arm 149 also clockwise, which positions the lug 151 above the projection 141, thereby locking the arm 139 and the machine release shaft 140 against any clockwise movement, so that the cash register is locked against release for a cycle of operation when the solenoid 110 is energized.

During this time, a holding voltage is applied across each of the solenoids 62 (FIG. 4) via the respective one of the resistors 106, the normally closed relay contact K2, and the switch SR1–A. However, the holding voltage is not sufficient to cause the armature 65 (FIG. 2) of the solenoid 62 to be actuated at this time.

Prior to the operation of the recorder 15, the wipers of the switches 81 to 85, inclusive, will already have been set to positions corresponding to the value of the actuated amount keys 11 (FIG. 1) of the cash register, as referred to above, and will remain in such set positions to the end of the cycle of operation of the cash register. Prior to the actuation of the armature 65 (FIG. 2) of the solenoid 62, as will be described more fully hereinafter, rotation of the main shaft 79 actuates each of the cams 78 to cause their associated segments 56 to be rotated counter-clockwise, as seen in FIG. 2, via the linkages 70, 71, and 75 and the square stud 72, under the influence of the tensioned spring 60. At this time, the wiper 92 (FIG. 4) of the switch SR1–B is traversing its fixed contacts 91 in unison with the rotation of the segments 56. As the wiper 92 passes seriatim over those six contacts 91 whose conductors 90 have been selected by the wiper 86 of the switches 81 to 85 inclusive, the solenoid 62 will be energized by substantially the whole of the D.C. supply voltage appearing across the terminals 103 and 104 of the rectifier 102, each solenoid 62 being so energized at the instant the wiper 92 of the switch SR1–B engages that one of the contacts 91 connected to that conductor 90 selected by the relevant wiper 86, this contact 91 being connected to the positive supply terminal 103 of the rectifier 102 via the wiper 92 and the arcuate contact 114 of the switch SR1–B and the normally closed relay contact K3. When a solenoid 62 is so energized, its armature 65 (FIG. 2) is pulled downwardly to rock its associated latch member 67 clockwise, as seen in FIG. 2, into engagement with the appropriate one of the teeth 58 of the relevant segment 56, thereby causing the latter to be arrested in a position corresponding to the value of the amount entered into the cash register by the corresponding amount key 11 (FIG. 1). The above-mentioned holding voltage causes the armature 65 (FIG. 2) of each solenoid 62 to remain actuated after the wiper 92 (FIG. 4) of the switch SR1–B passes on to the next contact 91. By means of the gears 52 and 53 (FIG. 2) and the teeth 55 of the segment 56, the corresponding type wheel 19 will be set to the appropriate digital position.

At 160 degrees of the cycle of rotation of the shaft 79, the wiper 92 (FIG. 4) of the switch SR1–B will be positioned on a contact 115, which causes energization of the solenoid 43 over the arcuate contact 114 and the closed contact K3. Referring to FIG. 3, energization of the solenoid 43 actuates its armature 42 to rock the latch 29 counter-clockwise, as seen in FIG. 3, about its pivot 28A, thereby moving the surface 30 of the latch from the path of the lug 25 on the printing member 17 (FIG. 1). The latter is thereby unlocked to enable it to be manually moved in a printing direction.

The counter-clockwise movement of the latch 29 (FIG. 3) permits the roller 33 on the actuator 34 for the switch SC2 to enter the recessed portion 31 of the latch 29 to open the switch SC2. Such opening of the switch SC2 has functional effect at this time. Also at 160 degrees' rotation of the main shaft 79, the switch SC1 (FIG. 4) is mechanically opened by means of a cam (not shown) mounted on the shaft 79 to switch off the motor 96, the latter being arrested at 165 degrees' rotation of the shaft by the associated solenoid 109. At this stage, the wiper 92 is still in engagement with the contact 115, so that the printing member 17 (FIG. 1) remains unlocked.

After the printing member 17 (FIG. 1) has been unlocked and the motor 96 stopped, the printing member 17, which carries a printing roller 18, is manually moved from left to right, as viewed in FIG. 1, so as to print the relevant information from the type wheels 19 (FIG. 1) and the credit card onto the sales slip positioned on the recorder. When the printing member 17 reaches its rightmost position, the front side portion 20 (FIG. 3) contacts the normally opened switch SC3 (FIG. 4), causing this switch to close. The closing of the switch SC3 causes the capacitor 116 (FIG. 4) to be charged from the D.C. supply via the resistor 118.

When the printer member 17 (FIG. 1) is restored to its home position by being moved to its leftmost position (FIG. 3), its lug 25 contacts the upstanding portion 39 of the lever 37, rocking the latter counter-clockwise about its pivot 38. By means of the stud 36 cooperating with the edge of the aperture 35, the latch 29 is rocked clockwise, as seen in FIG. 3, against the action of the spring 41, so that the surface 32 acts on the roller 33 to re-close the switch SC2. Restoration of the printing member 17 to its home position permits the switch SC3 (FIG. 3) to open again.

The closing of the switch SC2 causes the energization of the relay K (FIG. 4) by discharging the capacitor 116 over the diode 117. Upon the energization of the relay K, the contact K3 opens, causing the solenoid 43 to be de-energized to permit the latch 29 to be maintained in its locking position under the action of the spring 44. The self-holding contact K4 (FIG. 4) closes at this time, thereby holding the relay K energized over the switch SR1–A, the wiper 92 of which, at this stage, makes contact between the continuous contact 112 and the arcuate contact 113. Also upon energization of the relay K, the contact K2 (FIG. 4) opens to interrupt the holding circuits for the solenoid 62. However, the latches 67 (FIG. 2) are held against restoration at this time due to the frictional pressure of the teeth 58 thereagainst under the influence of the tension spring 60.

During this time, the contact K5 closes, so as to connect the solenoid 110 directly to the D.C. supply and thereby cause the solenoid 110 to be energized to lock out the cash register, as previously described. The motor 96 is switched on again when the relay K is energized, by virtue of the closure of the contact K1, and the remainder of the cycle of rotation of the shaft 79 is initiated. During this remainder of the cycle, each segment 56 (FIG. 2) and its associated linkages 70, 71, and 75 are positively restored to their home positions under the action of the square stud 72 acting on the cut-out portion 73 under the control of the peripheral edge of the cam 78, thereby causing the type wheels 19 to be restored to their zero positions at 355 degrees in the cycle, and causing the springs 60 to be re-tensioned in readiness for a subsequent setting operation of the segment 56. As the segments 56 are thus restored, the latches 67 are permitted to be restored counter-clockwise under the action of the springs 69.

During the restoring movement of the segment 56, the capacitor 116 (FIG. 4) is discharged over the resistor 119, thus enabling the relay K to be de-energized when the wiper 92 of the switch SR1–A is moved off the continuous contact 112 at 355 degrees of the cycle of rotation of the shaft 79, so as to interrupt the holding circuit for the relay K. Upon de-energization of the relay K, the contacts K1, K4, and K5 open, and the contacts K2 and K3 close. The contact SC1 opens at 355 degrees of the cycle, so as to cut off the current supply to the motor 96, whose shaft is eventually arrested at the completion of the cycle (360 degrees) by the associated solenoid 109. Opening of the contact K5 de-energizes the solenoid 110, so that the cash register is now unlocked for further operational cycles.

It will be seen that, in an operational cycle of the data-recording system described above for which the "Credit Total" transaction control key 12 is depressed, the amount entered in the cash register 10 is automatically entered into the credit card recorder 15, so that there is no risk of any human error occurring in setting the type wheels 19 of the recorder to this amount. Further, this system includes safety locking features which assure that the manually-operated printing member 17 of the recording device can only be operated following setting of the amount switches 81 to 85, inclusive, in consequence of the depression of the "Credit Total" transaction control key, which locks the cash register against a further cycle of operation while the printing member of the recording device is being operated. Moreover, the system enforces operation of the printing member of the recording device following depression of the "Credit Total" transaction control key, since the cash register is locked against further operation until after the printing member has been operated. The further advantage of systems such as that described above is that they can be provided by making relatively simple modifications to existing conventional cash registers and recording devices. Moreover, the fact that in such a system the cash register and the recording device are connected together by only a single cable enables an optimum working arrangement of the two machines to be adopted. Another advantage of this system described above is that the type wheels of the recording device are automatically reset to their home positions after operation of the printing member, thereby avoiding the risk of the recording device's being misused.

What is claimed is:

1. A data-recording system including:
   (a) a data entry device having banks of amount keys, a bank of transaction control keys, and a plurality of electrical amount switches which respectively correspond to different denominational banks of said amount keys and which have fixed digit-representing contacts and a wiper settable to any one of said contacts according to the value represented by the corresponding actuated amount key during a cycle of operation of the data entry device:
   (b) a remote recording device which includes
   (c) a plurality of settable type carriers each corresponding to a bank of amount keys;
   (d) means for moving said type carriers through a plurality of digit-representing positions when operated;
   (e) means for operating said moving means;
   (f) a manually-operable printing means for printing from the type carriers after said carriers have been set at a digit-representing position;
   (g) first switch means having a plurality of fixed digit-representing contacts and including wiper means operated by said operating means in synchronism with the operation of said moving means to sense each contact;
   (h) means connected to each wiper of said amount switches for disabling said moving means when operated, whereby the type carriers are positioned in a digit-representing position,
   (i) means interconnecting the respective fixed contacts of each amount switch with the fixed contacts of said first switch means to operate said disabling means upon sensing of the position of the wiper of said amount switches by the operation of the wiper means of said first switch means;
   (j) a second switch means mounted in said data entry device and having a plurality of contacts each representing a transaction key, said second switch means having a wiper settable to any of the contacts according to the transaction key depressed;
   (k) and means interconnecting one of the contacts of said second switch means and said operating means whereby, upon actuation of a predetermined transaction key during a cycle of operation of the data entry device, said operating means is operated to set the type carriers to the appropriate digit positions in accordance with the setting of the wipers of the amount switches.

2. The data-recording system of claim 1 in which said moving means includes:
   (a) a rotatably mounted segment member having a plurality of stop portions;
   (b) gear means interconnecting said segment member with a type carrier to position the type carrier commensurate with the position of the segment member;
   (c) and said disabling means includes a latch member operable to a position engaging one of said stop portions of the segment member, thereby stopping the movement of the segment;
   (d) and an electromagnetic member for moving said latch member to an engaging position when energized, said electromagnetic member connected to the wiper of said amount switches, whereby, upon the sensing of the position of the wiper of the amount switch by the wiper means of said first switch means, said electromagnetic member is energized to move the latch member into engagement with a stop portion of said segment member.

3. The data-recordnig system of claim 1 which includes:
   (a) means mounted in said data entry device for disabling the operation of the data entry device when operated;
   (b) third switch means having a plurality of contacts and including wiper means operated by said operating means in synchronism with the operation of the wiper of said first switch means;
   (c) and means interconnecting one of the contacts of said third switch means with the disabling means for the data entry device, whereby, upon operation of the wiper means of the third switch means, the disabling means is operated to disable the data entry device from operation.

4. The data-recording system of claim 3 which includes:
   (a) a locking member normally engaging said manually-operable printing member to disable said printing member from operation;
   (b) means for disabling said locking member from engagement with said printing member including a second electromagnetic member engaging said locking member and adapted to disable said locking member when energized;
   (c) and circuit means interconnecting said second electromagnetic member and said first switch means, whereby, upon completion of the sensing of the digit-representing contacts of the first switch means by its wiper means, said second electromagnetic member is energized.

5. A data-recording system including:
   (a) a data entry device having banks of amount keys, a bank of transaction control keys, and a plurality of electrical amount switches which respectively correspond to different denominational banks of said amount keys and which have fixed digit-representing contacts and a wiper settable to any one of said contacts according to the value represented by the corresponding actuated amount key during a cycle of operation of the data entry device:
   (b) a remote recording device which includes a plurality of settable type carriers each corresponding to a bank of amount keys;
   (c) a rotatable setting member for moving said type carriers through a plurality of digit-representing positions when operated;
   (d) means for operating said setting member including a motor and a motor-driven cam shaft;
   (e) a manually-operable printing means for printing from the type carriers after said carriers have been set at a digit-representing position;
   (f) a first rotary switch means having a plurality of fixed digit-representing contacts and a control contact and including wiper means operated by said motor-driven cam shaft to sense each contact;
   (g) a latch member mounted adjacent said setting member and adapted, when operated, to stop said setting member in a digit-representing position;
   (h) a solenoid engaging said latch member and adapted to operate said latch member when energized, said solenoid being connected to the wiper of an amount switch;
   (i) circuit means interconnecting the respective fixed contacts of each amount switch with the fixed contacts of said first switch means;
   (j) first energizing means connected to the wiper means of said first rotary switch means whereby said solenoid is energized upon sensing of the position of the wiper of an amount switch by the wiper means of said first rotary switch means, thereby setting the type carrier in a digit-representing position;
   (k) a second rotary switch means mounted in said data entry device and having a plurality of contacts each representing a transaction key, said second switch means having a wiper settable to any of the contacts according to the transaction key depressed;

(l) circuit means interconnecting one of the contacts of said second switch means and said motor;

(m) second energizing means connected to the wiper of said second rotary switch means whereby, upon actuation of a predetermined transaction key during a cycle of operation of the data entry device, said motor is energized to set the type carriers to the appropriate digit position in accordance with the setting of the wiper of the amount switches;

(n) means engaging said printing means for disabling the movement of said printing means, said disabling means being adapted to release the printing means for movement when operated;

(o) and circuit means interconnecting said control contacts of said first rotary switch means and the disabling means whereby said disabling means is operated upon completion of the setting of the type wheel carriers.

References Cited

UNITED STATES PATENTS

| | | | |
|---|---|---|---|
| 1,836,671 | 12/1931 | Langford | 101—93X |
| 3,138,091 | 6/1964 | Maul | 101—45 |
| 3,334,582 | 8/1967 | Mahoney | 101—45 |
| 3,405,634 | 10/1968 | Maul et al. | 101—45 |
| 3,466,429 | 9/1969 | Dunn et al. | 235—60.11 |

WILLIAM B. PENN, Primary Examiner

U.S. Cl. X.R.

101—322, 285